(12) United States Patent
Burkhardt

(10) Patent No.: US 7,512,619 B2
(45) Date of Patent: Mar. 31, 2009

(54) REAL TIME WORK QUEUE NOTIFICATION

(75) Inventor: Peter J. Burkhardt, Chesterfield, MA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 11/162,670

(22) Filed: Sep. 19, 2005

(65) Prior Publication Data

US 2007/0067324 A1    Mar. 22, 2007

(51) Int. Cl.
G06F 17/30 (2006.01)
(52) U.S. Cl. .............................. 707/101; 705/1; 705/9; 705/8
(58) Field of Classification Search .................. 707/101; 705/1, 8, 9
See application file for complete search history.

(56) References Cited

U.S. PATENT DOCUMENTS

| | | | | |
|---|---|---|---|---|
| 5,535,322 | A * | 7/1996 | Hecht | 705/1 |
| 5,627,764 | A * | 5/1997 | Schutzman et al. | 709/207 |
| 5,940,829 | A * | 8/1999 | Tsuiki et al. | 707/10 |
| 5,974,392 | A * | 10/1999 | Endo | 705/8 |
| 6,144,955 | A * | 11/2000 | Tsuiki et al. | 707/1 |
| 6,381,640 | B1 | 4/2002 | Beck et al. | |
| 6,442,565 | B1 | 8/2002 | Tyra et al. | |
| 6,502,087 | B1 * | 12/2002 | Tsuiki et al. | 707/1 |
| 6,807,558 | B1 | 10/2004 | Hassett et al. | |
| 2003/0120593 | A1 * | 6/2003 | Bansal et al. | 705/39 |
| 2003/0140021 | A1 * | 7/2003 | Ryan et al. | 706/16 |
| 2004/0039623 | A1 * | 2/2004 | Setteducati | 705/8 |
| 2006/0036692 | A1 * | 2/2006 | Morinigo et al. | 709/206 |
| 2006/0241996 | A1 * | 10/2006 | Burger et al. | 705/9 |

* cited by examiner

Primary Examiner—Don Wong
Assistant Examiner—Sheree N Brown
(74) Attorney, Agent, or Firm—Cuenot & Forsythe, L.L.C.

(57) ABSTRACT

A method of monitoring queues in real time can include building a master list specifying available queues, wherein each queue within the master list is associated with a user, and registering each queue specified by the master list with an instant messaging system. The method further can include sending, to a client, a secondary list of queues associated with a particular user and selected from the master list. The secondary list can be formatted as an instant messaging contact list. A presence on the instant messaging system can be established for each queue specified by the secondary list. The method also can include obtaining queue information for queues specified by the master list and making the queue information, for queues specified by the secondary list, available to the client via the instant messaging system.

8 Claims, 2 Drawing Sheets

REAL TIME WORK QUEUE NOTIFICATION

FIELD OF THE INVENTION

The present invention relates to workflow management.

DESCRIPTION OF THE RELATED ART

Many companies are defining and managing their business processes through the use of workflow management systems. A workflow management system can define and, to varying a degree, automate business processes within an organization. To implement a workflow, typically the various levels of management, or the responsible parties for a given process, are identified. Logic is written which controls the order in which tasks and/or other items of information are routed among the various parties or levels of the organization.

For example, in the context of an expense management system, a workflow can define the different levels of managers through which an expense form is to travel and be reviewed in order to be approved. Typically, the workflow management system functions using a series of queues. The workflow management system can route the electronic expense form from the queue of one person to the queue of the next, through the workflow implementation of the business process until the expense form is ultimately approved or denied.

In general, a queue is a storage area, whether fixed storage, RAM, etc., which can be used to temporarily store items such as messages, jobs, and the like awaiting service from a user. Once serviced or processed, an item is transferred to the next stage of the business process, i.e. to a next queue in the workflow. Each queue can be associated with a particular user, whether the user is defined as an individual user or is defined as a plurality of users that belong to a group, class, department, or the like. The queue functions similar to an inbox for an electronic mail system. With reference to the expense management system, for example, the electronic form can remain in a queue until the user to whom the queue is associated processes the form by either approving or denying the expense. The expense form then can be routed to the next queue defined in the business process or workflow.

Currently there are several ways to notify users that an item is located within the user's queue and requires attention. One way is to use electronic mail as a means of notification. Electronic mail, however, has disadvantages. One disadvantage is that electronic mail is asynchronous. As such, it often does not provide an acceptable level of integration with the workflow management system.

Another method of notification pertains to the case where a browser type of application is used as an interface for the workflow management system. In such systems, the user typically selects a refresh command to display the contents or number of items in the user's queue. One disadvantage of this technique, however, is that an affirmative action is required on the part of the user to view items in his or her queue.

Both of the notification methods described herein rely on asynchronous, "pull" type technology that requires manual checking by the user. It would be beneficial to provide a solution for monitoring and/or notifying users of the existence of items within queues which overcomes the limitations described above.

SUMMARY OF THE INVENTION

The present invention provides a method suitable for monitoring queues. One embodiment of the present invention can include a method of monitoring queues in real time. The method can include, responsive to a request for available queues in a workflow management system, receiving, within an application server, a master list from the workflow management system, wherein the master list specifies each available queue of the workflow management system and which user is associated with each available queue on the master list. The application server can register each queue specified by the master list with an instant messaging system.

The method further can include responsive to a request received from a client for a list of queues associated with a selected user, sending, to the client, a secondary list of queues associated with the particular user and selected from the master list. The secondary list can be formatted as an instant messaging contact list. A presence on the instant messaging system can be established for each queue specified by the secondary list. The method also can include the client subscribing with the instant messaging system to receive status information for each queue specified on the secondary list of queues. The application server can request queue information from the workflow management system, receive queue information for each available queue of the workflow management system responsive to the request, and send the queue information to the instant messaging system, wherein the queue information specifies a number of items within each available queue. The instant messaging system can select queue information for each queue of the secondary list from the queue information for each available queue and push the selected queue information to the client as an updated contact list wherein members of the contact list are queues of the secondary list. The client can display the secondary list of queues and further display an indication of the number of items within each respective queue from the secondary list.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for monitoring queues and/or notifying users of the existence of items within queues. In accordance with the inventive arrangements disclosed herein, queues of a workflow management system can be dynamically identified. Within an instant messaging system, presence can be established for each queue. Notifications regarding the existence of items within a given queue can be provided to a client application corresponding to a designated, or responsible, user via the instant messaging system.

Figure 1:
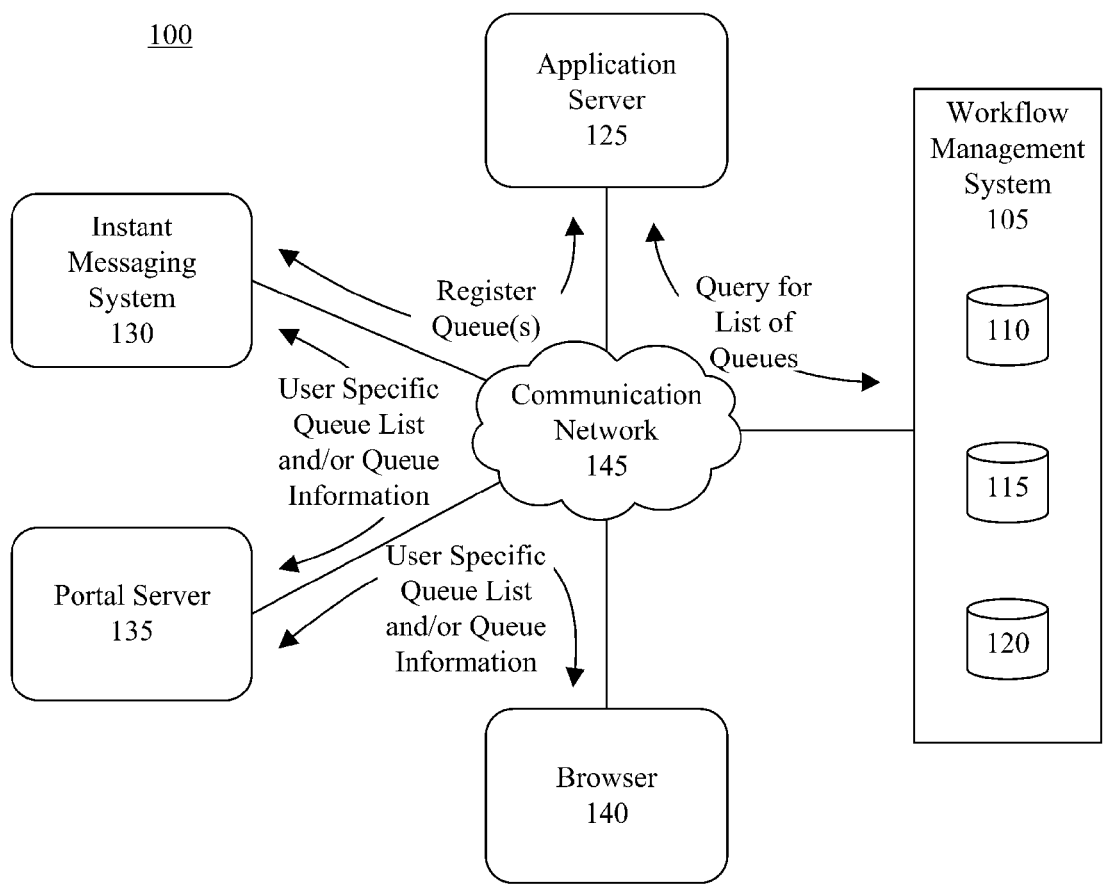
FIG. 1 is a schematic diagram illustrating a system for use in monitoring queue(s) in accordance with one embodiment of the present invention.

FIG. 1 is a schematic diagram illustrating a system 100 for use in monitoring queue(s) in accordance with one embodiment of the present invention. As shown, system 100 can include a workflow management system 105, an application server 125, an instant messaging system 130, a portal server 135, as well as a browser 140. Each of the aforementioned components can be communicatively linked via a communication network 145. The communication network 145 can include, but is not limited to, a wide area network, a local area network, an intranet, the Internet, wireless networks, and the like.

The workflow management system 105 can include a plurality of different queues 110, 115, and 120. While only three queues are illustrated, it should be appreciated that more or fewer queues can be incorporated as may be required. Typically, a queue is virtual storage space which is provided for each stage within a defined business process. Each queue can be associated with a particular user. As used herein, a user can refer to an individual user or to a plurality of users organized or considered to be a class, group, or the like. For example, a queue can be associated with a single manager user, a manager class of user, or a department where a plurality of users may have responsibility for items within the associated queue.

The application server 125 can be implemented as a server program executing within an information processing system. The application server 125 can execute one or more applications and/or provide business logic for one or more application programs. In one embodiment, the application server 125 can be a java-based application server, such as one configured to execute the Java 2 Platform, Enterprise Edition (J2EE). For example, the application server 125 can be implemented as Websphere® Application Server which is commercially available from International Business Machines Corporation of Armonk, New York (IBM).

In any case, the application server 125 can be configured to point to, or be aware of, the workflow management system 105. Accordingly, the application server 125 can query the workflow management system 105 to determine and/or identify queues contained therein as well as the particular user that is responsible or is associated with each identified queue. It should be appreciated that this process is dynamic in nature in that as queues are added or removed from the workflow management system 105, such information can be made available to the application server 125 in the form of a response to a query originating from the application server 125. The application server 125 can be configured to query the workflow management system 105 from time to time or on a periodic basis to dynamically update the list of available queues.

Instant messaging system 130 can send and receive instant messages to various users having a presence on the instant messaging system 130. As known, users can logon to the instant messaging system 130 to establish a presence. Once a user establishes a presence, that user can send and receive instant messages to other users also having a presence on the instant messaging server 130. In accordance with the inventive arrangements disclosed herein, the application server 125 can register each queue with the instant messaging system 130. Accordingly, with queues being registered with the instant messaging system 130, presence can be established for each queue.

In one embodiment of the present invention, the instant messaging system 130 can be implemented as IBM Lotus Sametime which is commercially available from IBM. Still, it should be appreciated that other instant messaging systems also can be used and that the present invention is not limited to one particular type or style of instant messaging system. For example, Session Initiation Protocol (SIP)/Session Initiation Protocol for Instant Messaging and Presence Leveraging Extensions (SIMPLE) type instant messaging systems which allow users to subscribe to the status of objects and receive Extensible Markup Language (XML) formatted presence documents also can be used.

The portal server 135 can function as a centralized gateway through which users of an organization can access various functions, computer programs, and the like. In general, the portal server 135 can provide personalization, single sign-on, and content aggregation from different sources as well as host the presentation layer of information systems. The various functions that users can access via the portal server 135 can be implemented as portlets.

A portlet refers to a component, such as a Web-based component, that usually is managed by a container such as the portal server 135. The component can process requests and generate dynamic content. For example, the portal server 135 can utilize portlets as pluggable user interface components to provide a presentation layer to information systems. The portlet can draw upon information contained within, or accessible by, the portal server 135, to display such information in the browser 140 for viewing by a user. From the user's point of view, a portlet is an application which is able to display and configure, within the user's browser, data, whether general or personalized.

In one embodiment, the portal server 135 can be implemented as WebSphere® Portal, which is commercially available from IBM, though the present invention is not limited to a particular type of portal. In such an embodiment, the portal server 135 can function as part of the J2EE environment, of which application server 125 also is a part. In any case, a portlet within the portal server 135 can be provided which allows a user to log in and obtain a list of queues for which the user is responsible or with which the user is associated. Queue information, such as the number of items within a given queue, the item itself, and the like, can be pushed through to a user's browser via the instant messaging system 130 as will be described in greater detail with reference to FIG. 2.

The system described with reference to FIG. 1 is presented for purposes of illustration only. As such, one or more components of the system can be replaced with suitable substitutes without departing from the spirit or scope of the present invention. In illustration, it should be appreciated that any of a variety of different Web servers, whether a Web application server, an HTTP server, a J2EE server, or the like can be used in lieu of the portal server if properly configured. For example, in one embodiment, an IBM Websphere Application Server can be used. The different functions described herein, particularly those described with reference to portlets, also can be implemented using any suitable technology depending upon the server configuration. For instance, one or more of the portlet functions can be implemented using Java applets.

Figure 2:
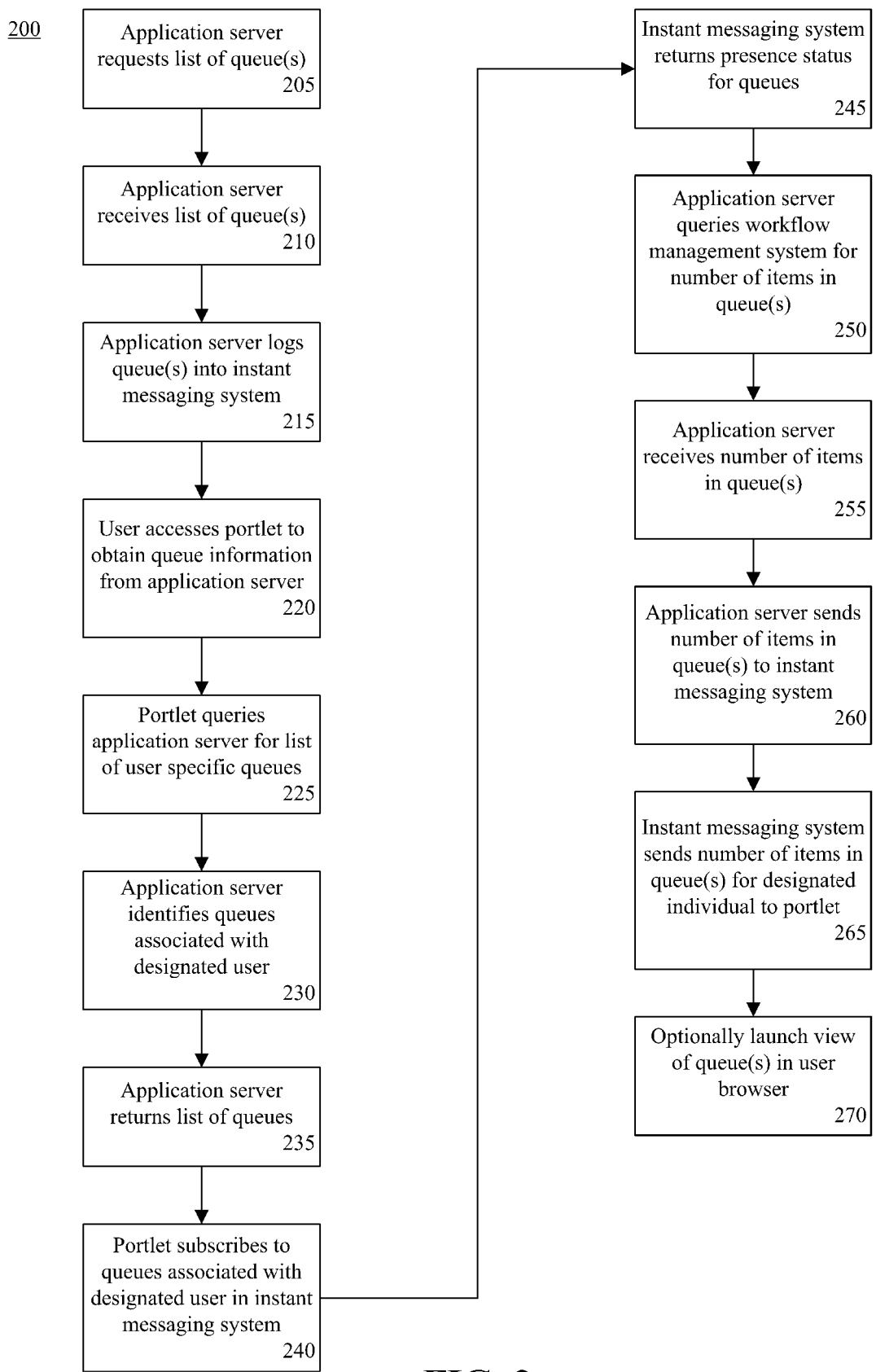
FIG. 2 is a flow chart illustrating a method of monitoring queue(s) in accordance with another embodiment of the present invention.

FIG. 2 is a flow chart illustrating a method 200 of monitoring queue(s) in accordance with another embodiment of the present invention. In one embodiment, method 200 can be implemented using the system illustrated with reference to FIG. 1. Still, the inventive arrangements are not so limited as any suitable system capable of performing the various steps disclosed herein can be used.

In step 205, the application server can query the workflow management system for a list of the available queue(s) disposed within the workflow management system. As noted, the application server can be configured to point to, and communicate with, the workflow management system. In step 210, the workflow management system can respond to the application server with such a listing. The listing of available queues from the workflow management system can be referred to as a "master list" in that queues for more than one user can be specified. This master list not only specifies the available queues, but also specifies which user is associated with, or responsible for, each queue specified by the returned master list. As such, user identifying information such as user identifiers, user network addresses, including instant messaging addresses, or the like can be determined from the list or can be specified directly by the list itself.

In step 215, the application server can register each queue specified by the master list with the instant messaging system. The registration process ultimately allows a presence to be established for each queue on the instant messaging system. The instant messaging system, in turn, provides system awareness for each identified queue. Further, the instant messaging system provides a mechanism for pushing information regarding the content of queues out to users. It should be appreciated that with the query ability of the application server, the master list can be dynamically updated. Accordingly, queues can be added and/or removed and updated with respect to presence on the instant messaging system.

In step 220, a user can access the portal server, and particularly a portlet within the portal server. The portlet allows the user to access queue information by interacting with the application server as well as the instant messaging system on behalf of the user. The portlet further can communicate with the workflow management system as will be described herein in greater detail. Accordingly, in step 225, the portlet can query the application server for a list of queues with which the user is associated or responsible. That is, the portlet can send user identifying information and/or credentials to the application server. The application server, in step 230, can identify those queues from the master list that are associated with the designated user. The queues associated with the designated user can be compiled into a list which can be referred to as the secondary list.

In step 235, the application server can return the list of queues that are associated with the designated user to the portlet. It should be appreciated that typically the returned list will be a subset of the queues specified by the master list. That is, while the master list can include queues for more than one user, the list of queues requested by the portlet pertains to a single user or a single group. In any case, the list of queues returned by the application server to the portlet for the designated user can be formatted as a contact list or a so called "buddy" list. A contact list typically displays those users that have a presence on an instant messaging system. In this case, however, the contact list specifies the particular queues with which the user is associated.

In step 240, the portlet can subscribe to queues associated with designated user in the instant messaging system. By subscribing to each such queue in the instant messaging system, a presence is established for each queue. In step 245, the instant messaging system can return to the portlet the presence status for each queue that is logged on. For example, the status can be available, offline, etc.

In step 250, the application server can query the workflow management system for queue information. In one embodiment, queue information can include, but is not limited to, the number of items within a queue. In this case, the application server can query the workflow management system for queue information pertaining to each queue specified by the master list. Further, if so configured, prior to requesting queue information, the application server can query the workflow management system for an updated list of available queues and update the master list accordingly. As noted, the application server can query the workflow management system on a periodic basis, from time to time, etc. In one embodiment, the interval at which the application server queries the workflow management system, whether for available queues or for queue information, can be adjusted by an administrator. In step 255, the application server receives the queue information and, particularly, the number of items within each of the queues within the workflow management system.

In step 260, the application server sends the number of items within each of the queues to the instant messaging system. In step 265, the instant messaging system can select the queue information for the queues associated with the designated user and forward that queue information to the portlet. Thus, the instant messaging system effectively pushes the number of items in each of the designated user's queues to the portlet. Once received, the portlet can present the number of items within each queue in similar fashion as a contact list. For example, a list of queues for which the user is responsible can be displayed by the portlet. Next, or proximate, to each queue name, the number of items located within that queue can be displayed.

In one embodiment of the present invention, in step 270, a view of one or more of the queues can be launched from within the user's browser. That is, if so configured, the user can access his or her queue(s) directly from within the browser, for example via the portlet. In such an embodiment, the portlet can query the workflow management system for the items located within one or more selected queues. A view of these items can be presented by the portlet. This allows the user to process particular items located within a queue directly from within the browser. The portlet can continue to communicate with the application server as may be required to further process items along the workflow path.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of monitoring queues in real time comprising:

responsive to a request for available queues in a workflow management system, receiving, within an application server, a master list from the workflow management system, wherein the master list specifies each available queue of the workflow management system and which user is associated with each available queue on the master list;

registering each queue specified by the master list with an instant messaging system;

responsive to a request received from a client for a list of queues associated with a selected user, sending, to the client, a secondary list of queues associated with the selected user and selected from the master list, wherein the secondary list is formatted as an instant messaging contact list, and wherein a presence on the instant messaging system is established for each queue specified by the secondary list;

the client subscribing with the instant messaging system to receive status information for each queue specified on the secondary list of queues;

the application server requesting queue information from the workflow management system, receiving queue information for each available queue of the workflow management system responsive to the request, and sending the queue information to the instant messaging system, wherein the queue information specifies a number of items within each available queue; and the instant messaging system selecting queue information for each queue of the secondary list from the queue information for each available queue and pushing the selected queue information to the client as an updated contact list wherein members of the contact list are queues of the secondary list, wherein the client displays the secondary list of queues and further displays an indication of the number of items within each respective queue from the secondary list.

2. The method of claim 1, wherein the client is a portlet executing within a portal server, the method further comprising the portlet subscribing, with the instant messaging system, to each queue of the secondary list, wherein the instant messaging system provides a status for each queue of the secondary list to the portlet.

3. The method of claim 2, further comprising sending queue information for each queue specified by the master list to the instant messaging system, whereby the instant messaging system sends queue information for each queue specified by the secondary list to the client.

4. The method of claim 3, wherein the client updates an instant messaging contact list specifying queues of the secondary list according to the queue information.

5. The method of claim 1, said client displaying an instant messaging contact list specifying queues of the secondary list and updating the instant messaging contact list according to received queue information.

6. The method of claim 1, wherein queue information comprises a number of items within a queue, the method further comprising:

the instant messaging system pushing the number of items within each queue of the secondary list to a portlet associated with the selected user; and presenting the list of secondary queues within the portlet with the number of items.

7. The method of claim 1, further comprising:

querying a workflow management system for available queues; and identifying a user associated with each available queue.

8. The method of claim 7, wherein the master list is built dynamically according to said querying and identifying steps.

* * * * *